(12) United States Patent  
Gao

(10) Patent No.: US 10,800,071 B2  
(45) Date of Patent: Oct. 13, 2020

(54) FLOOR LOCKING DEVICE FOR A WIND TURBINE BLADE MOULD

(71) Applicant: Gurit Tooling (Taicang) Co., Ltd., Suzhou, Jiangsu (CN)

(72) Inventor: Qiang Gao, Suzhou (CN)

(73) Assignee: Gurit Tooling (Taicang) Co., Ltd., Suzhou, Jiangsu (CN)

( * ) Notice: Subject to any disclaimer, the term of this patent is extended or adjusted under 35 U.S.C. 154(b) by 101 days.

(21) Appl. No.: 16/325,200

(22) PCT Filed: Sep. 30, 2016

(86) PCT No.: PCT/CN2016/101018  
§ 371 (c)(1),  
(2) Date: Feb. 13, 2019

(87) PCT Pub. No.: WO2018/058500  
PCT Pub. Date: Apr. 5, 2018

(65) Prior Publication Data  
US 2019/0176370 A1    Jun. 13, 2019

(51) Int. Cl.  
*B29C 33/30* (2006.01)  
*B29C 33/26* (2006.01)  
(Continued)

(52) U.S. Cl.  
CPC .............. *B29C 33/30* (2013.01); *B29C 33/20* (2013.01); *B29C 33/26* (2013.01); *B29L 2031/085* (2013.01); *Y02P 70/50* (2015.11)

(58) Field of Classification Search  
CPC ......... B29C 33/30; B29C 33/26; B29C 33/20; Y02P 70/523; B29L 2031/085  
See application file for complete search history.

(56) References Cited

U.S. PATENT DOCUMENTS

| 5,143,736 A | 9/1992 | Kumamura et al. |
| 8,727,764 B2 | 5/2014 | Ossanai et al. |

(Continued)

FOREIGN PATENT DOCUMENTS

| CN | 102271885 | 12/2011 |
| CN | 102756441 | 10/2012 |

(Continued)

OTHER PUBLICATIONS

Extended European Search Report in corresponding EP application No. 16917252.5 dated Jan. 13, 2020.

(Continued)

*Primary Examiner* — Nahida Sultana  
(74) *Attorney, Agent, or Firm* — Polsinelli, P.C.

(57) ABSTRACT

Locking device for locking a movement side of a wind turbine blade mould to a floor at a desired level, the locking device having a first locking component for mounting to a floor surface and a second locking component adapted to be fitted to a movement side of a wind turbine blade mould to be locked by the locking device, wherein one of the first and second locking components includes a clamp engaging member, and the other of the first and second locking components includes an actuator and a clamp member coupled to the actuator, the clamp member being movable by operation of the actuator between a retracted position and an extended position, the clamp member including a clamp surface which in one of the retracted and extended positions is arranged to apply a clamping force on the clamp engaging member.

32 Claims, 5 Drawing Sheets

(51) Int. Cl.
*B29C 33/20* (2006.01)
*B29L 31/08* (2006.01)

(56) References Cited

U.S. PATENT DOCUMENTS

| | | | |
|---|---|---|---|
| 2006/0034971 | A1 | 2/2006 | Olsen et al. |
| 2012/0021086 | A1 | 1/2012 | Ossanai et al. |
| 2013/0318789 | A1* | 12/2013 | Gabeiras ................. F03D 13/10 29/889.7 |
| 2014/0306376 | A1 | 10/2014 | Tapia et al. |
| 2015/0232307 | A1* | 8/2015 | Holloway ............... F03D 80/50 414/800 |
| 2015/0345465 | A1* | 12/2015 | Westergaard ........... F03D 13/40 29/889.21 |
| 2016/0090962 | A1* | 3/2016 | Gil Moll ............... F03D 1/0691 416/144 |
| 2017/0121155 | A1* | 5/2017 | Westergaard ........... F03D 13/10 |
| 2018/0250895 | A1* | 9/2018 | Wardropper .......... B29C 70/345 |
| 2019/0010931 | A1* | 1/2019 | Thomsen .................. B60P 3/40 |
| 2019/0257292 | A1* | 8/2019 | Melen .................... F03D 13/10 |
| 2019/0358911 | A1* | 11/2019 | Hedges .............. B29D 99/0028 |
| 2020/0156289 | A1* | 5/2020 | With Moller .......... B25B 5/006 |

FOREIGN PATENT DOCUMENTS

| | | |
|---|---|---|
| CN | 203765847 | 8/2014 |
| CN | 204869384 | 12/2015 |

OTHER PUBLICATIONS

International Search Report and Written Opinion in PCT/CN2016/101018 dated May 24, 2017.

\* cited by examiner

FLOOR LOCKING DEVICE FOR A WIND TURBINE BLADE MOULD

FIELD OF THE INVENTION

The present invention relates to a locking device for locking a movement side of a wind turbine blade mould to a floor at a desired level. The present invention particularly relates to such a locking device which enables the movement side of a wind turbine blade mould to be clamped to the floor at a desired level so as to minimize movement and possible distortion of the wind turbine blade mould during the wind blade production process.

BACKGROUND OF THE INVENTION

With the development of science and technology, wind power as a safe and green renewable energy has developed rapidly. In recent years, the production technology of wind turbine blades has been continuously developed and improved. Current wind turbine blades typically have a length of more than 50 metres and are moulded out of fibre reinforced resin composite material.

Accordingly, exceedingly large moulds are required which have a mould surface corresponding to the dimensions of the wind blade to be moulded.

A typical wind turbine blade mould has a "clamshell-like" construction, comprising two mould halves hingedly fitted together along a longitudinal edge of the mould. One mould half is statically fixed, forming a fixed side of the mould, and the other mould half is hingedly movable, on a movement side of the mould. The movement side is hinged open about the hinged longitudinal edge, so as to be located horizontally adjacent to the fixed side, in order to load the mould with materials to be moulded and to unload the moulded blade. The movement side is closed over the fixed side during the moulding operation.

In current known wind turbine blade moulds, high precision is required for the levelness at the movement side during manufacture of the blade. A typical mould has a length on the order of dozens of meters, and is supported by several turnover mechanisms which hingedly connect the two mould halves together. Typically, a spacing of more than ten metres is provided between adjacent turnover mechanisms. When the movement side of the mould is turned onto the floor in a traditional way, there is no effective levelness-adjusting device and levelness-fixing at the movement side.

During manufacture of wind turbine blades using such a mould, when the movement side of the mould is hinged open, the rear portions of the movement side engage and are supported by the surface of the floor. However, if the floor is uneven or of an incorrect height, all or parts of the movement side can be supported at varying or incorrect levels. This can distort the movement side of the mould, potentially leading to damage of the mould and/or poor moulding tolerances. Traditionally, there has been no effective levelness-adjusting device and/or distortion restricting device provided at the movement side of the mould.

Some moulding operations require the movement side to be set completely level in the open mould configuration. For typical moulding operations historically used in the state of the art, the shear web part of the wind turbine blade to be moulded is installed on the mould at the fixed side, and the levelness of the fixed side can readily be ensured without any negative impact on blade quality. Recently however, some blades require a different production process, which installs the shear web on the mould at the movement side when the mould is opened. It is important that the movement side of the mould is level and not distorted when being loaded with the shear web.

For this reason, high requirements are now required for the levelness of the mould at the movement side.

SUMMARY OF THE INVENTION

In light of the problems with potential poor levelness and potential distortion of the movement side of wind turbine blade moulds, in particular large wind turbine blade moulds as discussed above, the present invention aims effectively to solve these problems, and aims to provide a locking device which enables the movement side of a wind turbine blade mould to be clamped to the floor at a desired, accurately set, level so as to minimize, and preferably eliminate, potential movement and possible distortion of the wind turbine blade mould during the wind blade production process. The present invention accordingly provides a locking device for locking a movement side of a wind turbine blade mould to a floor at a desired level, the locking device comprising a first locking component for mounting to a floor surface and a second locking component adapted to be fitted to a movement side of a wind turbine blade mould to be locked by the locking device, wherein one of the first and second locking components comprises a clamp engaging member, and the other of the first and second locking components comprises an actuator and a clamp member coupled to the actuator, the clamp member being movable by operation of the actuator between a retracted position and an extended position, the clamp member including a clamp surface which in the one of the retracted and extended positions is arranged to apply a clamping force on the clamp engaging member.

Preferably, the first locking component further comprises a height setting mechanism for fixing the first locking component at a selected height above the floor.

In some embodiments, the height setting mechanism comprises an adjustable screw mechanism for fitting between the floor and a lower surface of the first locking component.

In other embodiments, the height setting mechanism comprises at least one gasket removably inserted between a lower surface of the first locking component and the floor, the gasket having a desired thickness.

Typically, the at least one gasket is adapted to be removably inserted either directly between the lower surface of the first locking component and the floor or between the lower surface of the first locking component and a base fitted to the floor. The locking device is typically provided in combination with a plurality of gaskets of different thickness for removable insertion to vary a height of the first locking component.

In preferred embodiments, the actuator is a hydraulic actuator which is a cylinder and piston assembly mounted between a support fixed to one of the first and second locking components and the movable clamp member.

Preferably, when the clamp member is in the extended position or the retracted position the cylinder and piston assembly is in an extended position or a retracted position respectively.

In one preferred embodiment, the actuator is substantially vertically oriented and the retracted and extended positions of the clamp member are substantially vertically separated in the extended and retracted position. Typically, the second locking component comprises the actuator which is fitted to the movement side of the wind turbine blade mould and the first locking component comprises the clamp engaging member.

In this preferred embodiment, preferably the clamp member is arranged to apply an upward clamping force on the clamp engaging member when the clamp member is in the retracted position. Preferably, the clamp engaging member comprises a body defining a recess for receiving the clamp member, and configured to permit the clamp member to move vertically within the recess between the extended and retracted positions. Optionally, the body further comprises an opening in a wall above the recess, the opening being shaped and dimensioned to receive an extensible part of the actuator, the extensible part being movable both vertically within the opening and horizontally into and out of the opening.

In an alternative preferred embodiment, the first locking component comprises a base for mounting to a floor surface, a casing mounted above the base, the actuator and clamp member being mounted within the casing the clamp member being movable by operation of the actuator between a retracted unlocking position and an extended locking position, the clamp member including a clamp surface which in the extended locking position is oriented downwardly and is arranged to apply a downward clamping force on the clamp engaging member of the second locking component. The casing has a lower surface, and at least one gasket of a height setting mechanism is removably inserted between the lower surface of the casing and the base, the gasket having a desired thickness. Typically, the cylinder and piston assembly is substantially horizontally oriented in the extended and retracted positions.

In the preferred embodiment, the clamp member is rotatably mounted about a pivot and is mounted to be movable by rotation between the retracted unlocking position and the extended locking position.

Preferably, the casing includes an arcuate cam track and the clamp member has mounted thereon a shaft which is configured to move as a cam in the arcuate cam track.

More preferably, the cam track and cam are configured to guide the rotary movement of the clamp member between opposite end positions respectively corresponding to the retracted unlocking position and the extended locking position.

Typically, the arcuate cam track is part-circular and extends upwardly and forwardly in a direction towards the extended locking position of the clamp member.

In the preferred embodiment, there is a pair of opposed cam tracks and a pair of opposite shafts which respectively move in a respective cam track.

Typically, the pair of opposite shafts comprise opposite ends of a common pin shaft.

Optionally, the arcuate cam track comprises an opening in a wall of the casing.

In the preferred embodiment, the clamp member comprises a pair of spaced wall members and an end of the actuator is mounted between the pair of spaced wall members.

In the preferred embodiment, the casing comprises a pair of spaced side walls extending upwardly from a support plate and the actuator and clamp member are mounted between the pair of spaced side walls.

Preferably, the clamp engaging member is fitted to the movement side of the wind turbine blade mould.

More preferably, the clamp engaging member comprises a pair of spaced flange portions and a rod mounted between the flange portions.

In some embodiments, an elongate support base extends away from the first locking component, the elongate support base being set at a level orientation, and the elongate support base is arranged to support an elongate frame member of the movement side and to keep the movement side level when the movement side is in an open configuration.

There is further provided in accordance with a second aspect of the present invention a locking system for locking a movement side of a wind turbine blade mould to a floor at a desired level, the locking system comprising a plurality of the locking devices according to the present invention.

Preferably, the locking system further comprises a common power source for the locking devices which is connected to the plurality of locking devices by a plurality of power connectors.

More preferably, the actuator is a hydraulic actuator, the common power source comprises a hydraulic pump and the power connectors comprise hydraulic pipes.

There is further provided in accordance with a third aspect of the present invention a movement side of a wind turbine blade mould in combination with the locking system according to the present invention.

The locking device of the preferred embodiments of this invention can function to lock the movement side of the mould onto the floor by providing an adjustable floor locking device. The floor locking device can adjust the levelness and restrict the distortion of the movement side. For instance, when installing the shear web on the mould at the movement side, the locking device of the preferred embodiment of this invention can helps to reduce installation deviation between the blade at movement side and the molded surface of the shear web, and can thus improve the blade quality.

The locking device of the preferred embodiment of this invention can function to adjust the levelness at the movement side of an adjustable wind turbine blade mould.

As discussed above, traditionally, there has been no effective levelness-adjusting device and/or distortion restricting device provided at the movement side of the currently known wind turbine blade moulds.

In contrast, the locking device of the preferred embodiments of this invention changes this situation by installing a floor locking system at the floor of the movement side of the mould. The support is fixed in the desired position on the floor. Adjustable screws, or a gasket or shim of a selected thickness, can be employed to provide that the locking mechanism is at the correct height relative to the movement side of the mould.

A hydraulic cylinder and piston assembly is preferably used as an actuator, using a hydraulic fluid (e.g. oil) which is pumped as a power source, to provide locking and unlocking configurations. In one embodiment, the actuator moves vertically between an upper locked configuration, with a clamp member locked to a base, and a lower unlocked configuration. In another embodiment, the actuator converts substantially horizontal straight-line movement of the hydraulic cylinder and piston assembly into a downwardly acting clamping force of a clamp member, which clamps downwardly onto a clamp engaging member affixed to the movement side of the mould.

When the mould is opened and the movement side turned onto the floor, the floor locking device can be used to firmly lock the frame, typically of steel, at the movement side, and can adjust the levelness of the mould and restrict or eliminate any distortion at the movement side of the mould.

BRIEF DESCRIPTION OF THE DRAWINGS

Embodiments of the present invention will now be described by way of example only, with reference to the accompanying drawings, in which.

DETAILED DESCRIPTION

Figure 1:
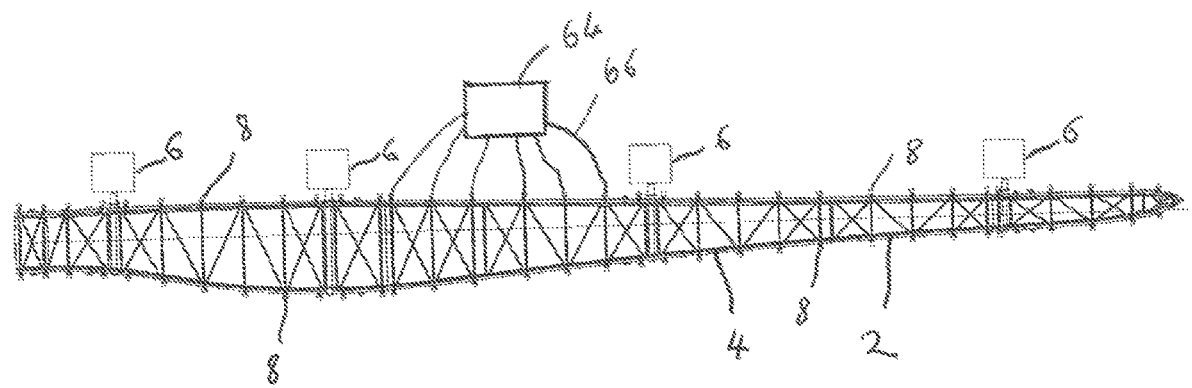
FIG. 1 is an overall schematic plan view of a movement side of a wind turbine blade mould incorporating a locking system, including a plurality of locking devices, for locking the movement side of the wind turbine blade mould to a floor at a desired level according to an embodiment of the present invention.

Referring to FIG. 1, a movement side 4 of a wind turbine blade mould 2 is shown in an open position. The fixed side is not shown. The movement side 4 and the fixed side are hingedly connected together by a series of rotary mechanisms 6, known in the art as mould turnover devices. The wind turbine blade mould 2 typically has a length of at least 30 metres, and more typically has a length of at least 50 metres. The rotary mechanisms 6 are typically spaced at least 10 metres apart along the length of the mould 2. In the illustrated mould 2 there are four rotary mechanisms 6. However, any appropriate number may be employed.

A plurality of locking devices 8 are mounted on the floor (only some of the locking devices 8 are indicated by reference numerals in FIG. 1 for clarity of illustration). The locking devices 8 are located and configured for locking the movement side 4 of the wind turbine blade mould 2 to a floor at a desired level. Each locking device 8 can be locked at a respective individual desired level.

Figure 2:
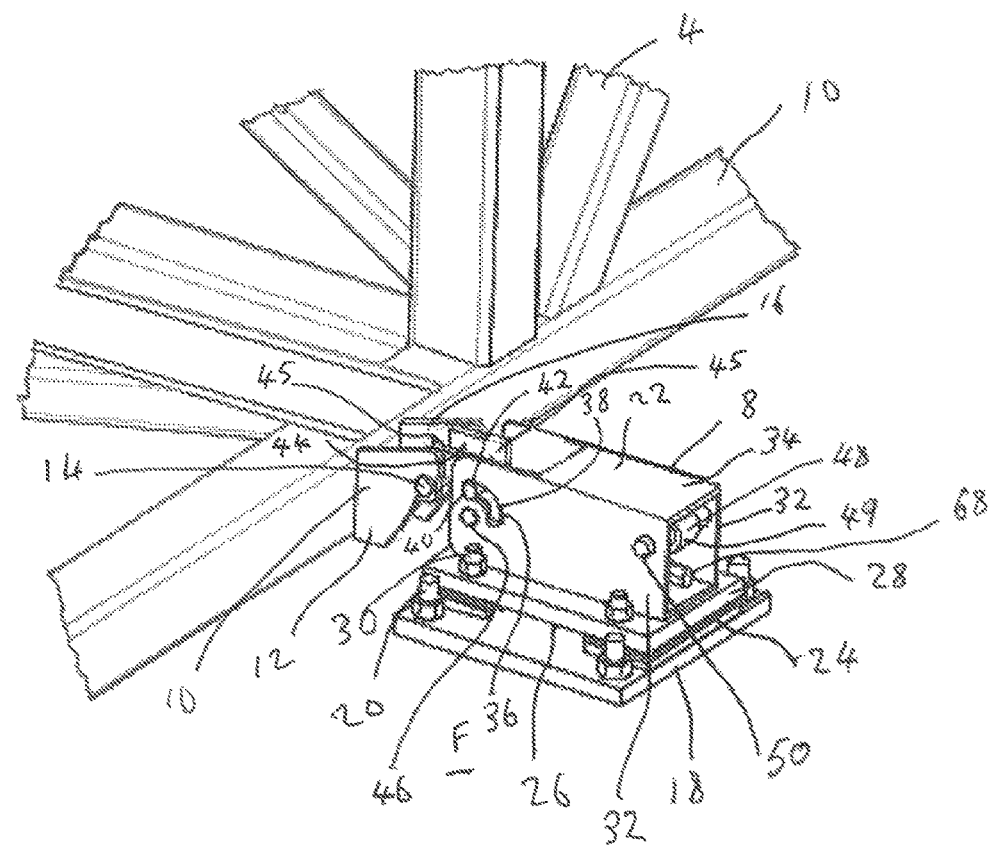
FIG. 2 is a schematic perspective view of one embodiment of an individual locking device as illustrated in FIG. 1 in a locking configuration with a respective clamp engaging member of a movement side of the mould of FIG. 1.
Figure 3:
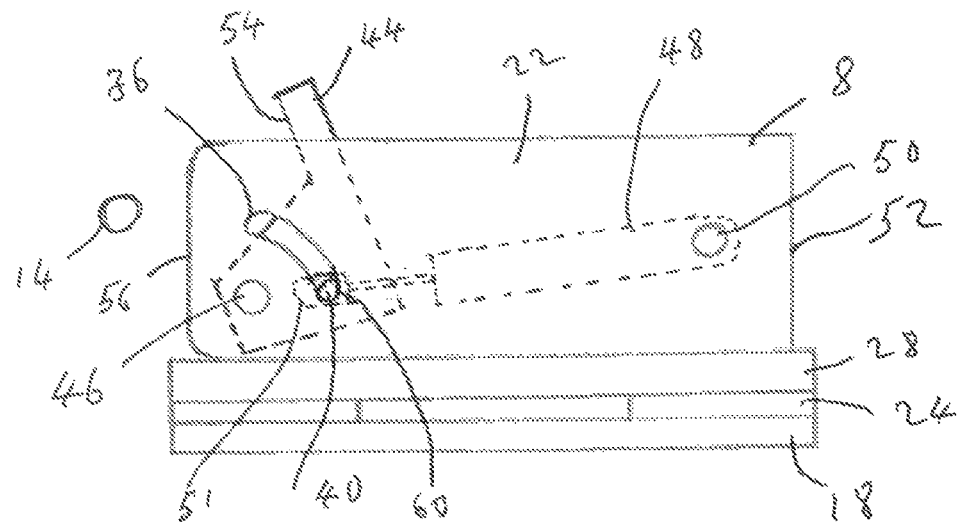
FIG. 3 is a schematic side view, partly in phantom, of the individual locking device as illustrated in FIG. 2 in an unlocked configuration with a respective clamp engaging member of a movement side of the mould of FIG. 1.
Figure 4:
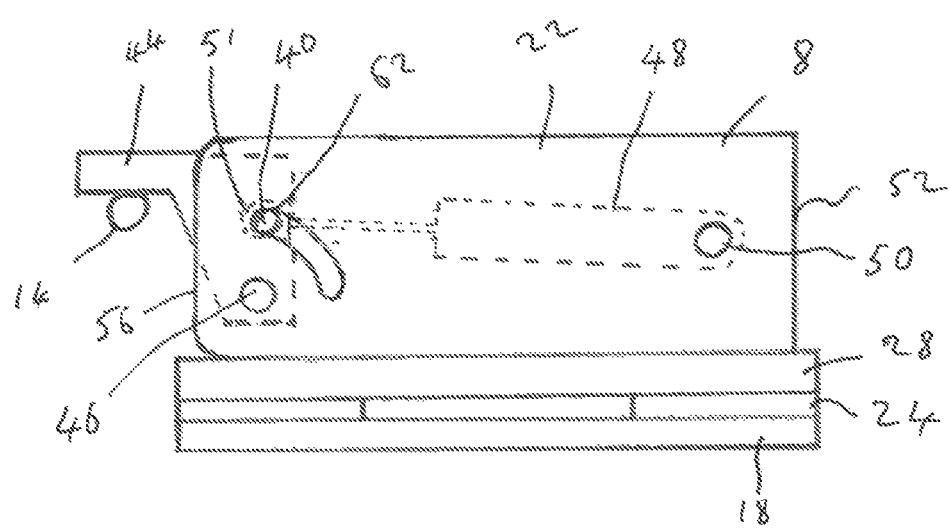
FIG. 4 is a schematic perspective side view, partly in phantom, of the individual locking device as illustrated in FIG. 2 in a locking configuration with a respective clamp engaging member of a movement side of the mould of FIG. 1.

Referring also to FIGS. 2 to 4, which illustrate a first embodiment of the present invention, the locking device 8 comprises a first locking component 100 for mounting to a floor surface F and a second locking component 102 adapted to be fitted to the movement side 4 of the wind turbine blade mould 2 to be locked by the locking device 8. The location of each locking device 8 is selected so that the locking device 8 can securely clamp to a clamp engaging member 12 fixed to the steel framework 10 of the movement side 4. In this embodiment, locking devices 8 are provided along both longitudinal edges of the movement side 4. Typically, the locking devices are spaced from each other by a distance significantly smaller than the separation distance of the rotary mechanisms 6. The same spacing distance is typically used along the length of the movement side 4. For example, the locking devices may be spaced from each other by a distance of from 1 to 2 metres, although other distance may be employed, for example at the junction of individual mould parts of the movement side 4. In the illustrated mould 2 there are more than twenty locking devices 8 along each longitudinal edges of the movement side 4. However, any appropriate number may be employed.

The first locking component 100 comprises a clamp engaging member 12, and the second locking component comprises an actuator 48 and a clamp member 44 coupled to the actuator 48. The clamp member 44 is movable by operation of the actuator 48 between a retracted position and an extended position. The clamp member 44 includes a clamp surface 54 which in the extended position is arranged to apply a clamping force on the clamp engaging member 12.

Referring again to FIG. 2, at each location on the movement side 4 associated with a respective locking device 8, a clamp engaging member 12 is fixed to the steel framework 10 of the movement side 4, or example by welding. The clamp engaging member 12, typically of steel, comprises a rigid cylindrical rod 14 mounted between opposed flange portions 16 which are fixed to the steel framework 10.

Each locking device 8 comprises a base plate 18. The base plate 18 is fixed to the floor F by expansion bolts 20, which extend through the base plate 18. The first locking component 100 further comprises a height setting mechanism 104 for fixing the first locking component 100 at a selected height above the floor F. A casing 22 is removably mounted above the base plate 18 and at least one shim or gasket 24 is removably inserted between a lower surface 26 of a support plate 28 of the casing 22 and the base plate 18. The thickness of the at least one shim or gasket 24 is selected so that the respective locking device 8 is set at a desired level or height. Any shim/gasket 24 or combination of shims/gaskets can selectively be inserted between the casing 22 and base plate 18. The thickness of the shim/gasket 24 can be changed as desired by separating the casing 22 and base plate 18, inserting a new shim/gasket 24 and re-assembling the casing 22 and base plate 18.

Accordingly, when the support plate 28 of the casing 22 is fixed to the base plate 18 by mounting bolts 30, which extend through the support plate 28 and are fixed to the base plate 18, the casing 22 is set at a desired level or height relative to the floor surface. Each locking device 8 can be set at an individually selected height by appropriate selection of the thickness of the at least one shim or gasket 24.

The casing 22 includes a pair of opposed side walls 32 and a top wall 34, these walls typically being formed from a pressed steel plate. Each side wall 32 includes an arcuate opening 36 which defines a grooved cam track 38. The arcuate opening 36 extends, from a central lower part of the respective side wall 32, upwardly and forwardly towards a front face of the locking device 8. A pin shaft 40 extends between the opposed arcuate openings 36 and is configured to move as a cam 42 in the opposed cam tracks 38.

A clamp member 44, comprising a pair of spaced wall members 45, is rotatably mounted to the pair of opposed side walls 32 by a pivot member 46. The pin shaft 40 is fitted to the clamp member 44 at an offset or eccentric position relative to the pivot member 46.

Referring also to FIGS. 3 and 4, a hydraulic cylinder and piston assembly 48, comprising a hydraulic actuator 48, is mounted between a translationally fixed position, at which a first end 49 of the hydraulic cylinder and piston assembly 48 is fitted to a shaft 50 fixed between the pair of opposed side walls 32 and located towards a rear face 52 of the locking device 8, and a translationally movable position, at which a second end 51 of the hydraulic cylinder and piston assembly 48 is fitted to the clamp member 44.

As shown in FIG. 3, when the hydraulic cylinder and piston assembly 48 is in a retracted position, the clamp member 44 is rotated rearwardly and downwardly about pivot member 46 and the pin shaft 40 is located at a bottom 60 of the arcuate openings 36. This causes a clamp surface 54 on the clamp member 44 to be rotated away from the front face 56 of the locking device 8, and away from possible engagement with the clamp engaging member 12, in particular the rigid cylindrical rod 14.

In contrast, as shown in FIG. 4, when the hydraulic cylinder and piston assembly 48 is in an extended position, the clamp member 44 is rotated forwardly and upwardly about pivot member 46 and the pin shaft 40 is located at a top 62 of the arcuate openings 36. This causes the clamp surface 54 of the clamp member 44 to be rotated forwardly so as to extend beyond the front face 56 of the locking device 8. In this position, the clamp surface 54 of the clamp member 44 engages the rigid cylindrical rod 14 of the clamp engaging member 12 which is fixed to the steel framework 10 of the movement side 4. The movement side 4 is locked at a defined level or height.

In the locking position, the height or level of the clamp surface 54 is fixed relative to the casing 22 of the locking device 8 by the pin shaft 40 being located at the top 62 of the arcuate openings 36, since the upper end of the arcuate openings 36 defines a stop for the motion of the clamp surface 54 relative to the casing 22. The height or level of the clamp surface 54 relative to the base plate 18 is also defined by the thickness of the at least one shim or gasket 24. Therefore, by selecting a desired thickness for the shim or gasket 24, the height of the clamp surface 54 relative to the floor can be accurately and individually preset.

Each of the locking devices 8 can be preset to a desired clamping height of level relative to the specific floor surface to which the respective locking device 8 is mounted. This provides that the level of the movement side 4 in an open configuration can accurately be preset along its entire length by the provision of a plurality of closely spaced locking devices 8 along the length of the movement side 4, each being individually preset to a desired level.

The locking system may be retrofitted to an existing wind turbine blade mould.

In operation, a plurality of clamp engaging members 12 is fixed to the steel framework 10 of the movement side 4 along both longitudinal edges of the movement side 4. A corresponding plurality of locking devices 8 is mounted to the floor surface F, and the location of each locking device 8 is selected so that the locking device 8 can securely clamp to a respective clamp engaging member 12. The level of each locking device 8 is preset by selecting an appropriate thickness of shim or gasket 24. This can compensate for differences in floor level, so that any required compensation of the deviation brought by an uneven floor can be achieved when installing the locking system and prior to use.

The hydraulic actuators 48 of the locking devices 8 are connected to a common hydraulic pump station 64 by a plurality of hydraulic pipes 66 (only some of the pipes 66 being shown in FIG. 1 for clarity of illustration). The pipes 66 each connect to an input port 68 (see FIG. 2) of a respective hydraulic actuator 48 The hydraulic actuators 48 are initially unpressurised so that the hydraulic cylinder and piston assembly 48 is in a retracted position, and the clamp surface 54 on the clamp member 44 is rotated away from the front face of the locking device 8.

When the movement side 4 is opened, the steel framework 10 of the movement side 4 is lowered to the floor surface F. The hydraulic actuators 48 are now pressurised by operation of the common hydraulic pump station 64 so that the hydraulic cylinder and piston assembly 48 is in an extended position. The clamp surface 54 on the clamp member 44 is rotated forwardly so as to extend beyond the front face of the locking device 8. In this position, the clamp surface 54 of the clamp member 44 engages the clamp engaging member 12 which is fixed to the steel framework 10 of the movement side 4. The movement side 4 is locked at a defined level or height. The locking devices can be subsequently released by depressurising the hydraulic actuators 48.

This use of an independent hydraulic pump station 64 connected by hydraulic oil pipes 66 to a plurality of hydraulic actuators 48, each in a respective locking mechanism 8, provides that the actuators 48 can be clamped and released rapidly and synchronously through hydraulic control.

In use, before locking the movement side 4 of the mould 2, initially the levelness of the movement side 4 is adjusted and preset in order to ensure a levelness of the mould 2, so that subsequently the floor locking system will ensure the pre-adjusted levelness of the mould 2, and restrict or eliminate any distortion at the movement side 4.

Figure 5:
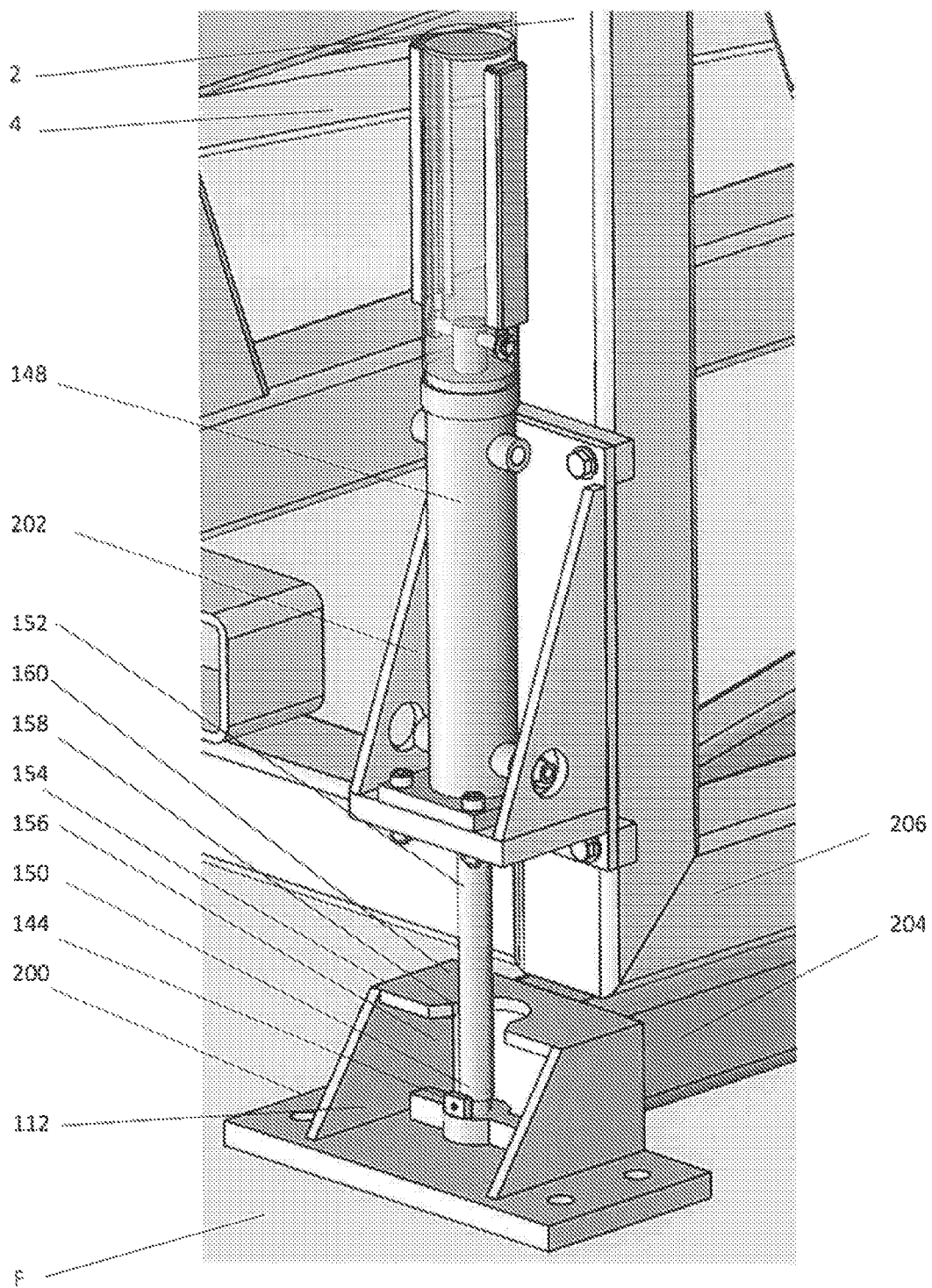
FIG. 5 is a schematic perspective view of a further embodiment of an individual locking device as illustrated in FIG. 1 in an unlocked configuration with a respective clamp engaging member of a movement side of the mould of FIG. 1.
Figure 6:
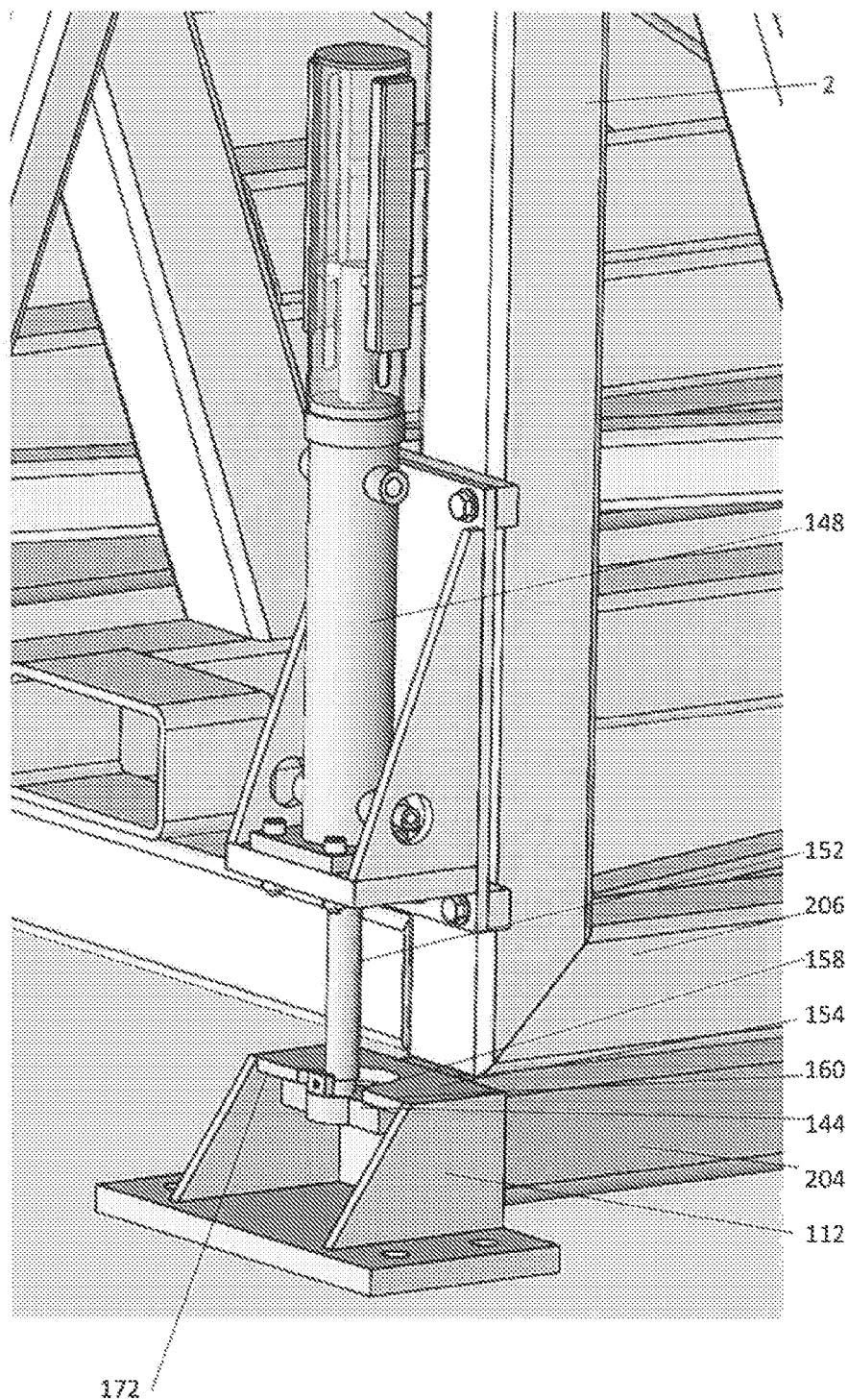
FIG. 6 is a schematic perspective view of the individual locking device as illustrated in FIG. 5 in a locked configuration with the respective clamp engaging member of the movement side of the mould of FIG. 1.

Referring also to FIGS. 5 and 6, which illustrate a second embodiment of the present invention, the actuator 148 is substantially vertically oriented and the retracted and extended positions of the clamp member 144 are substantially vertically separated in the extended and retracted position. In this embodiment, the first locking component 200, fitted to the floor F, comprises the clamp engaging member 112 and the second locking component 202, fitted to the mould 2, comprises the actuator 148 which is fitted to the movement side 4 of the wind turbine blade mould 2 and the clamp member 144. An elongate support base 204 extends away from, and is preferably connected to, the first locking component 200, for example a rear part of the clamp engaging member 112, and is set at a level, e.g. horizontal, orientation. The elongate support base 204 is arranged to support an elongate frame member 206 of the movement side 4 and to keep the movement side 4 level when the movement side 4 is in an open configuration.

In this embodiment, the hydraulic actuator 148 is mounted vertically and a lower end 150 of the piston rod 152 has the clamp member 144 mounted thereon. The clamp member 144 comprises an enlarged endpiece on the piston rod 152. The clamp member 144 is arranged to apply an upward clamping force on the clamp engaging member 112 when the clamp member 144 is in the retracted, i.e. upward, position. The clamp engaging member 112 comprises a body 154 defining a recess 156 for receiving the clamp member 144. The body 154 is configured to permit the clamp member 144 to move vertically within the recess 156 between the extended and retracted positions. The body 154 further comprises an opening 158 in a wall 160 above the recess 156. The opening 158 is shaped and dimensioned to receive an extensible part of the actuator, which in this embodiment is the piston rod 152. The extensible part, i.e. piston rod 152, is movable both vertically within the opening 158 and horizontally into and out of the opening 158.

Figure 7:
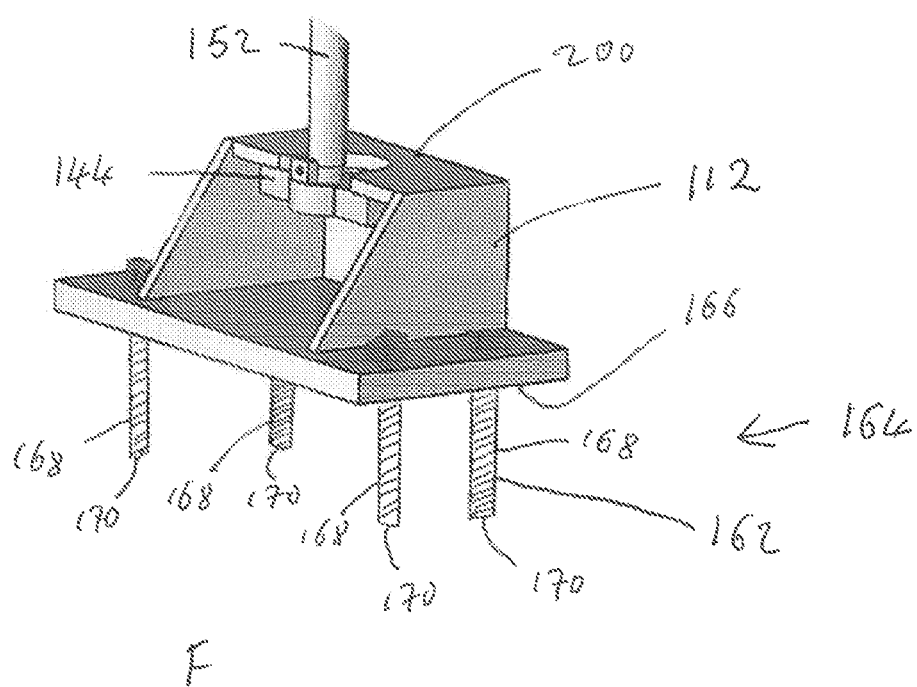
FIG. 7 is a schematic perspective view of a height setting mechanism for the individual locking device as illustrated in FIGS. 5 and 6.

In this embodiment, as shown in FIG. 7, the height setting mechanism 164 comprises an adjustable screw mechanism 162 for fitting between the floor F and a lower surface 166 of the clamp engaging member 112 of the first locking component 200. The adjustable screw mechanism 162 typically comprises a plurality of helically threaded screws 168, typically mutually spaced around the periphery of the clamp engaging member 112, which threadably or freely engage the clamp engaging member 112 to permit the screws 168 to be individually rotated so that the lower end 170 of the screw 168 extending downwardly from the lower surface 166 of the clamp engaging member 112 can be set at a required distance from the lower surface 166 to enable the clamp engaging member to be set at a desired height. The lower end 170 of the screw 168 can bear against the floor surface F or can be threadably received in a female thread of a receiving element (not shown) recessed into or fitted to the floor, for example a base member fitted to the floor and similar to the base plate 18 of the first embodiment.

In operation, the clamp engaging member 112 is fitted to the floor at the desired level by individual adjustment of the screws 168. The support base 204 is connected to the clamp engaging member 112 and is set at a level, i.e. horizontal, orientation. The mould 2 is opened and the movement side 4 is positioned so that the hydraulic actuator 148 carrying the clamp member 144 are located vertically above the clamp engaging member 112. In addition, the movement side 4 is lowered onto the level support base 204, which functions to support the movement side 4 and to keep the movement side 4 level. The piston rod 152 is moved to its extended position so that the clamp member 144 is located at a height below the opening 158 in the wall 160 above the recess 156, and located at lateral position adjacent to the recess 156. Then the clamp member 144 is moved horizontally and laterally into the recess 156, for example manually, and the piston rod 152 is received into the opening 158. This position is shown in FIG. 5. The hydraulic actuator is then actuated and the piston rod 152 is moved to its retracted position so that the clamp member 144 is moved upwardly against the lower surface 172 of the wall 160 so as to apply an upward clamping force on the clamp engaging member 112 when the clamp member 144 is in the retracted, i.e. upward, position. This position is shown in FIG. 6. The height of this position is set by the height of the clamp engaging member 112 which has been set by the screws 168.

Alternatively, height adjusting gaskets as described above may be used in this embodiment instead of screws, and in the first embodiment screws may be used instead of gaskets as the height adjustment mechanism.

Although the illustrated embodiments of the present invention employ a wind turbine blade mould, the present invention may be implemented in moulds for moulding other large articles of composite material using moulds having a fixed part and a movement part and turnover devices.

By utilizing the locking device of the present invention, the movement side of the mould can be locked to the floor by the locking device, which means the movement side can be fixed and is not easy to distort. Such a locking device is not known in the state of the art for the manufacture of wind turbine blades. The height of the locking device is adjustable by adding or removing a shim or gasket, or by adjusting screws, which means the movement side level is readily adjustable. The movement side and floor device can be locked and released quickly by hydraulic control. The movement side mould level can be adjusted conveniently. The hydraulic control system has a strong and stable hydraulic clamping force. The device has a simple structure, which is easy to operate and maintain.

The invention claimed is:

1. A locking device for locking a movement side of a wind turbine blade mould to a floor at a desired level, the locking device comprising: a first locking component for mounting to a floor surface and a second locking component adapted to be fitted to a movement side of a wind turbine blade mould to be locked by the locking device; wherein one of the first and second locking components comprises a clamp engaging member, and the other of the first and second locking components comprises an actuator and a clamp member coupled to the actuator, the clamp member being movable by operation of the actuator between a retracted position and an extended position, the clamp member including a clamp surface which in one of the retracted and extended positions is arranged to apply a clamping force on the clamp engaging member.

2. A locking device according to claim 1, wherein the first locking component further comprises a height setting mechanism for fixing the first locking component at a selected height above the floor.

3. A locking device according to claim 2, wherein the height setting mechanism comprises an adjustable screw mechanism for fitting between the floor and a lower surface of the first locking component.

4. A locking device according to claim 3, wherein the height setting mechanism comprises at least one gasket removably inserted between a lower surface of the first locking component and the floor, the at least one gasket having a desired thickness.

5. A locking device according to claim 4, wherein the at least one gasket is adapted to be removably inserted either directly between the lower surface of the first locking component and the floor or between the lower surface of the first locking component and a base fitted to the floor.

6. A locking device according to claim 4, in combination with a plurality of the gaskets of different thickness for removable insertion to vary a height of the first locking component.

7. The locking device according to claim 1, wherein the actuator is a hydraulic actuator which is a cylinder and piston assembly provided between a support fixed to one of the first and second locking components and the movable clamp member.

8. The locking device according to claim 7, wherein when the clamp member is in the extended position or the retracted position the cylinder and piston assembly is in an extended position or a retracted position respectively.

9. The locking device according to claim 1, wherein the actuator is substantially vertically oriented and the retracted and extended positions of the clamp member are substantially vertically separated in the extended and retracted positions.

10. The locking device according to claim 9, wherein the second locking component comprises the actuator which is fitted to the movement side of the wind turbine blade mould and the first locking component comprises the clamp engaging member.

11. The locking device according to claim 10, wherein the clamp member is arranged to apply an upward clamping force on the clamp engaging member when the clamp member is in the retracted position.

12. The locking device according to claim 11, wherein the clamp engaging member comprises a body defining a recess for receiving the clamp member, and configured to permit the clamp member to move vertically within the recess between the extended and retracted positions.

13. The locking device according to claim 12, wherein the body further comprises an opening in a wall above the recess, the opening being shaped and dimensioned to receive an extensible part of the actuator, the extensible part being movable both vertically within the opening and horizontally into and out of the opening.

14. The locking device according to claim 1, wherein the first locking component comprises a base for mounting to a floor surface, a casing mounted above the base, the actuator and clamp member being mounted within the casing the clamp member being movable by operation of the actuator between a retracted unlocking position and an extended locking position, the clamp member including a clamp surface which in the extended locking position is oriented downwardly and is arranged to apply a downward clamping force on the clamp engaging member of the second locking component.

15. The locking device according to claim 14, wherein the casing has a lower surface, and at least one gasket of a height setting mechanism is removably inserted between the lower surface of the casing and the base, the gasket having a desired thickness.

16. The locking device according to claim 14, wherein the cylinder and piston assembly is substantially horizontally oriented in the extended and retracted positions.

17. The locking device according to claim 14, wherein the clamp member is rotatably mounted about a pivot and is mounted to be movable by rotation between the retracted unlocking position and the extended locking position.

18. The locking device according to claim 17, wherein the casing includes an arcuate cam track and the clamp member has mounted thereon a shaft which is configured to move as a cam in the arcuate cam track.

19. The locking device according to claim 18, wherein the cam track and cam are configured to guide the rotary movement of the clamp member between opposite end positions respectively corresponding to the retracted unlocking position and the extended locking position.

20. The locking device according to claim 19, wherein the arcuate cam track is part-circular and extends upwardly and forwardly in a direction towards the extended locking position of the clamp member.

21. The locking device according to claim 18, wherein there is a pair of opposed cam tracks and a pair of opposite shafts which respectively move in a respective cam track.

22. The locking device according to claim 21, wherein the pair of opposite shafts comprise opposite ends of a common pin shaft.

23. The locking device according to claim 18, wherein the arcuate cam track comprises an opening in a wall of the casing.

24. The locking device according to claims 14, wherein the clamp member comprises a pair of spaced wall members and an end of the actuator is mounted between the pair of spaced wall members.

25. The locking device according to claim 14, wherein the casing comprises a pair of spaced side walls extending upwardly from a support plate and the actuator and clamp member are mounted between the pair of spaced side walls.

26. The locking device according to claim 14, wherein the clamp engaging member is fitted to the movement side of the wind turbine blade mould.

27. The locking device according to claim 26, wherein the clamp engaging member comprises a pair of spaced flange portions and a rod mounted between the flange portions.

28. The locking device according to claim 1, further comprising: an elongate support base extending away from the first locking component, the elongate support base being set at a level orientation, and wherein the elongate support base is arranged to support an elongate frame member of the movement side and to keep the movement side level when the movement side is in an open configuration.

29. A locking system according to claim 1, the locking system comprising: a plurality of the locking devices.

30. A locking system according to claim 29, further comprising: a common power source for the locking devices which is connected to the plurality of locking devices by a plurality of power connectors.

31. A locking system according to claim 30, wherein the actuator is a hydraulic actuator, the common power source comprises a hydraulic pump and the power connectors comprise hydraulic pipes.

32. A locking system according to claim 29, further comprising: a movement side of a wind turbine blade mould in combination with the locking system.

* * * * *